Jan. 14, 1969  J. G. THIBODAUX, JR  3,421,325
SOLID PROPELLANT ROCKET MOTOR
Filed Nov. 8, 1961

INVENTOR
JOSEPH G. THIBODAUX, JR.

BY

ATTORNEYS 3,421,325
SOLID PROPELLANT ROCKET MOTOR
Joseph G. Thibodaux, Jr., 116 Selden Road,
Newport News, Va. 23606
Continuation-in-part of application Ser. No. 8,200,
Feb. 11, 1960. This application Nov. 8, 1961, Ser.
No. 151,110
U.S. Cl. 60—255     9 Claims
Int. Cl. F02k 9/04

The invention described herein may be manufactured and used by or for the Government of the United States of America for governmental purposes without the payment of any royalties thereon or therefor.

This application is a continuation-in-part of my copending application for U.S. Letters Patent, Serial No. 8,200, filed Feb. 11, 1960, now abandoned.

This invention relates generally to a rocket motor, and more particularly to a solid propellant rocket motor.

Heretofore, one type of prior art solid fuel rocket motor has been produced by completely filling a motor casing with a solid propellant. The propellant adjacent the nozzle opening is ignited, and the propellant burns forwardly along a single plane. Subsequently, it was determined that the thrust developed by such a motor would be increased by enlarging the burning area of the propellant. Accordingly, an improved type of prior art motor included a concavity formed centrally in the propellant charge to provide a larger burning surface. Several methods of forming this internal concavity have been proposed. One such method involves precasting the solid propellant into quadrants which, when positioned within the motor casing, form a solid charge having an internal concavity collinear with the motor nozzle. Another such proposed method involves precasting the propellant in rectangular bars, which are placed around the inner surface of the motor casing to form an annular propellant charge. These prior art solid fuel motors and the methods for producing the same were not considered entirely satisfactory, however, due to the multiplicity of steps necessary to form the propellant charge and position it within the motor casing. Another prior art method of producing solid fuel motors involves placing a cavity forming mandrel within a motor casing, casting a propellant around the mandrel, and then removing the mandrel from the motor. In removing the mandrel, however, the propellant charges quite often are broken or displaced in the casing, forming cracks in the propellant within which some combustion takes place upon motor ignition. These cracks cause the motor to exhibit uneven linear thrust when fired. Moreover, the size of the cavity formed in the charge is, of necessity, limited by the size of the nozzle opening in the motor casing through which the mandrel is extracted. It will be apparent, therefore, that prior art methods of making solid propellant rocket motors leave much to be desired, due to the relatively large number of operational steps needed to produce the motors. Furthermore, the motors produced by such prior art methods are generally of poor quality with limited shelf life and are characterized by unreliability of performance.

Accordingly, it is an object of the present invention to provide a new and improved solid propellant rocket motor.

Another object of the instant invention is to provide a new and improved contoured charge ignition cavity for a solid fuel rocket motor.

A further object of the present invention is to provide a new and improved solid fuel rocket motor capable of being fired with a charge contouring mandrel in place within the motor.

A still further object of the instant invention is to provide a new and improved solid fuel rocket motor having a longer shelf life.

Another still further object of the invention is to provide a new and improved solid fuel rocket motor having reliable high altitude ignition capabilities.

Still another object of the present invention is to provide a new and improved solid propellant rocket motor capable of establishing an equilibrium operating condition in a vacuum.

Still a further object of the invention is to provide a new and improved solid fuel rocket motor capable of being fired without a nozzle closure.

Generally speaking, the foregoing and other objects are accomplished in accordance with this invention by the provision of a solid propellant rocket motor having a rigid foamed plastic mandrel permanently positioned axially within the motor propellant, and electro-responsive ignition means positioned within the mandrel.

A more complete understanding of the invention and many of the attendant advantages thereof will be readily appreciated as the same becomes better understood by reference to the following detailed descritpion when considered in connection with the accompanying drawing wherein.

Figure 1:
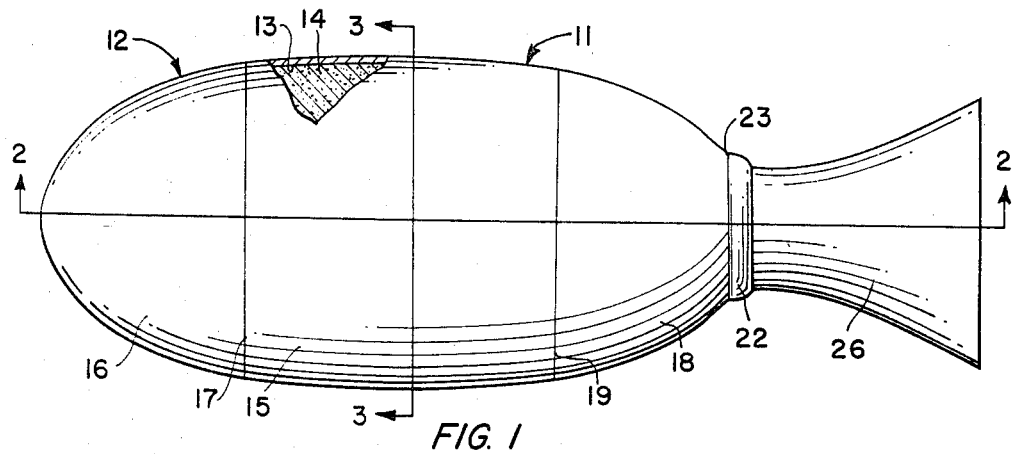
FIG. 1 is a plan view of the rocket motor of the present invention, with parts broken away to show the internal shell structure.
Figure 2:
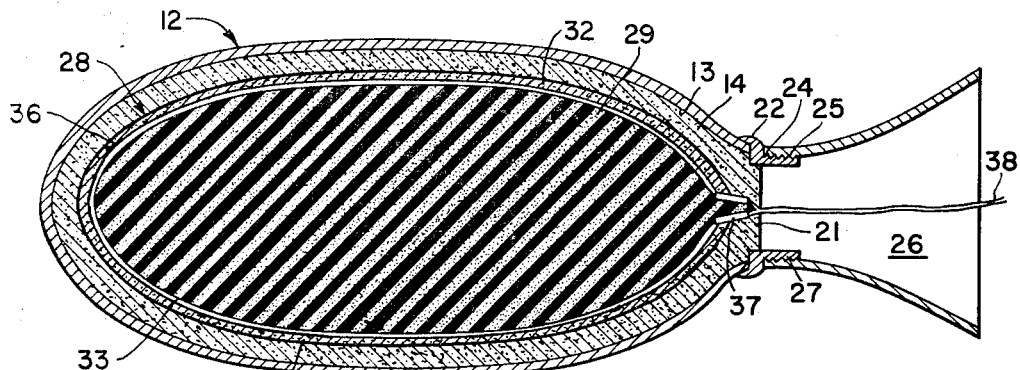
FIG. 2 is an elevational cross-sectional view of the rocket motor taken along line 2—2 of FIG. 1; and, FIG. 3 is a cross-sectional view of the rocket motor taken along line 3—3 of FIG. 1.

Referring now to the drawing, wherein like reference numerals designate identical or corresponding parts throughout the several views, and more particularly to FIG. 1, the rocket motor, generally indicated by the reference numeral 11, is shown provided with a motor casing 12 having a concavity 13 defined by the inner surface of casing 12 and containing a solid propellant 14. Casing member 12 includes a substantially cylindrical center section 15 having one end securely attached to a hemispheroidal front section 16 along the abutting edges thereof by a weld 17. A hemispheroidal rear section 18 is likewise affixed to center section 15 at the other end thereof by a weld 19 along the abutting edges of the adjoining members. Motor casing 12 preferably is formed of SAE 4130 steel having a thickness of approximately $\frac{1}{16}$ to $\frac{1}{25}$ inch. As shown in FIG. 2, rear section 18 is provided with an aperture or bore 21 formed centrally therein, and an annular overlying plate 22 firmly secured around aperture 21 to rear section 18 in any conventional manner, such for example, as by a weld 23. Annular plate 22 includes an integral rearwardly directed annular projection 24 of reduced diameter having external screw threads 25. A frustro-conical nozzle element 26 having an internally threaded smaller forward end portion 27 is connected to rear motor casing section 18 by engagement with projection 24.

Figure 3:
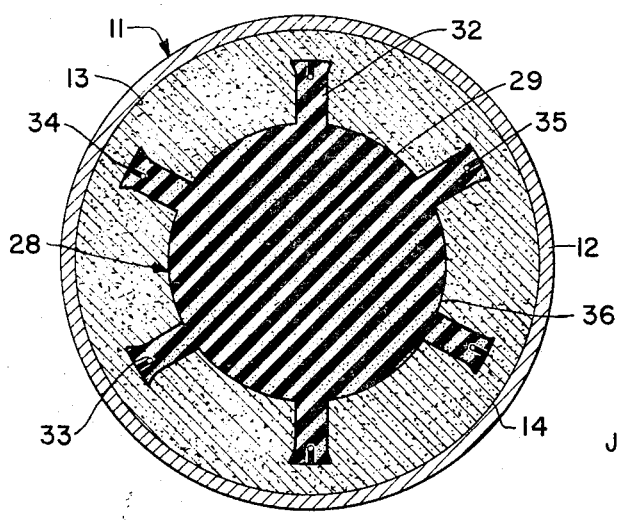

A mandrel, generally designated by the reference numeral 28, is axially disposed in propellant 14 within motor casing 12, as shown in FIG. 3. Mandrel 28 has a prolate spheroidal shaped center body member 29 preferably having a forward portion and an after portion conforming in shape to the forward and after portions, respectively, of concavity 13. Body member 29 is provided with equidistantly radially spaced essentially T-shaped projections 32 extending along the entire length of mandrel 28, which terminate short of the inner surface of casing 12 so that a layer of propellant 14 lines the interior surface of casing 12. It will be noted, as more fully set forth hereinafter, that the maximum diameter of mandrel 28 exceeds the diameter of motor casing aperture 21 to provide a larger propellant burning suface. The propellant lining between casing 12 and projections 32 further provides heat protection for the wall structure of casing 12 until propellant combustion is near termination. A string igniter 33 such, for example, as Pyrocore or the equivalent, is positioned centrally and longitudinally within each projection 32 in a slit or groove 34 (FIG. 3) extending along the entire length of each of the projections 32. A seam filler 35 of an ignitable mixture consisting of boron potassium nitrate and a binder such, for example, as Vistanex or the like, is positioned within slit 34 above the string igniter 33 and extending to the exterior surface of mandrel 28. A thin layer 36 (FIG. 2) of the ignitable mixture also preferably covers the entire exterior surface of mandrel 28.

A mild electroresponsive end primer 37 is connected to the terminal end portion of each string igniter 33, as shown in FIG. 2. Primer 37 is connected to leads 38 which extend through aperture 21 to the exterior of motor 11 and which in turn are connected to an exterior source of electrical energy, not shown.

Mandrel 28 is preferably formed by foaming a chemical reaction mixture capable of producing a rigid cellular plastic foam having a density of approximately 2 to 3 pounds per cubic foot in a mold. One such suitable reaction mixture is a reactable mixture of a polyester and a polyisocyanate which is poured into a mold having the desired mandrel configuration and foamed therein. The foaming reaction and molding are carried out by conventional methods. After the completion of the foaming reaction, the foamed mandrel 28 is removed from the mold. Each radial projection 32 is then split lengthwise and centrally to the center thereof with a foam cutting tool such, for example, as a knife or a heated wire. A string igniter 33 is placed in each projection slit 34 and extends completely around the mandrel 28. An ignitable slurry of about 95 percent boron potassium nitrate and about 5 percent of a binder such, for example, as Vistanex, or the equivalent, is placed in a carrier such as hexane and poured into slit 34. The hexane evaporates readily leaving a seam filler 35 (FIG. 3) of the ignitable material extending from string igniter 33 to the exterior surface of mandrel 28. A thin layer 36 of the ignitable slurry is also applied to the exterior surface of mandrel 28 by brushing or spraying.

In manufacturing the rocket motor of the present invention, the motor casing 12 may initially be partially assembled by connecting center section 15 to forward section 16 along the abutting edges thereof by weld 17. The partially assembled motor casing may then be positioned with its longitudinal axis vertically disposed and forward section 16 in a lowermost position. Mandrel 28 may next be placed in the motor casing, and rear section 18 brought into peripheral contact with center section 15. The electrical leads 38 which are interconnected with mandrel 28 are passed upwardly through aperture 21 of rear section 18, and may be utilized to suspend mandrel 28 within concavity 13 of casing 12 with the parts of mandrel 28 spaced inwardly of the interior wall of motor casing 12 in operative position as illustrated in FIGS. 2 and 3 of the drawing. The motor casing center section 15 and rear section 18 may then be connected together by weld 19, which may be accomplished, for example, by the conventional argon arc welding process; the spacing between motor casing 12 and mandrel 18 being sufficient to prevent ignition of mandrel 28 by heat developed in motor casing 12 by the welding operation. The cavity formed in motor casing 12 between mandrel 28 and the interior wall of the casing is then filled by pouring through aperture 21 a liquid polysulfide perchlorate propellant 14 such, for example, as Thiokol T–21 or the equivalent; care being exercised in casting the propellant against displacement of mandrel 28 within the motor casing. Upon completion of the propellant casting operation, the propellant is solidified and cured by maintaining the filled motor casing at a temperature of approximately 140° F. to 150° F. for about 4 hours in an oven or similar heating device. After curing, the charge is trimmed, if necessary, and nozzle 26 is threadedly connected to casing 12.

In operation of the motor, electrical energy supplied from an external source passes through leads 38 and ignites the electroresponsive primer 37. Primer 37, after ignition, initiates a chain reaction by igniting string igniters 33 which, in turn, ignite seam filler 35 and layer 36 of the ignitable mandrel material. During the chain reaction the foam mandrel 28 is destroyed by combustion, exposing the surface of propellant 14, which is simultaneously ignited, thereby activating motor 11.

Since propellant 14 is sealed within motor casing 12 from the outside atmosphere by the permanently positioned mandrel 28, oxidation of the propellant by the atmosphere is substantially reduced thereby improving the shelf life of the rocket motor. In addition, mandrel 28 allows the motor to be fired without a nozzle closure, and provides for a more reliable high altitude ignition, as there is no loss of gases under near vacuum conditions at high altitudes. Permanent mandrel 28 also provides the necessary inertia to allow buildup of gas pressure required to establish an equilibrium operating condition under vacum.

Moreover, mandrel 28 can form any desired concavity shape within the solid fuel charge, as the diameter of mandrel 28 is no longer limited by the diameter of aperture 21 since mandrel 28 does not have to be removed from the motor through this opening.

Obviously numerous modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A rocket motor comprising a motor casing, an aperture formed in said casing, an exhaust nozzle connected to said casing about said aperture, a foamed rigid plastic mandrel having a diameter greater than said aperture permanently disposed within said casing until combustion occurs to form a propellant-receiving cavity between the casing and the mandrel, said mandrel having a plurality of projections extending radially outwardly toward said casing, each said projection incorporating a string igniter-receiving slot therein, a string igniter disposed within the slot of each mandrel projection below the surface thereof, igniter means carried by said mandrel adjacent the radial extremities of said projections electrically connected to each of said string igniters adjacent the casing aperture, a polysulphide perchlorate propellant disposed in the cavity formed between said casing and said mandrel in sealed relation to the mandrel body and mandrel radial projections, said propellant providing a plurality of relatively enlarged, concavity-shaped propellant burning surfaces conforming respectively to the body and radial projection portions of the mandrel and in proximity to the string igniters incorporated in the radial projections; said mandrel being initially sealed to the propellant adjacent the radial extremities of the projections and the aperture of the casing and subsequently demolished by combustion and said propellant ignited upon ignition of said igniter means.

2. A rocket motor comprising an elongated motor casing having integrally attached end members, an opening substantially smaller in diameter than said casing formed in the rearwardly extending end member, an exhaust nozzle connected to said rearwardly extending end member about said opening, a foamed rigid plastic mandrel having a diameter greater than said opening permanently axially disposed within said casing, said mandrel having a plurality of projections extending radially outwardly toward said casing, a solid propellant disposed in the cavity formed between said casing and said mandrel in initial sealed, surrounding relation to said mandrel and radial projections, first ignition means positioned within each of the mandrel projections adjacent the outer surfaces thereof and contiguous to the burning surface of the propellant, and second electroresponsive ignition means positioned adjacent the rearwardly extending, terminal ends of each of said projections electrically attached to the terminal ends of said first ignition means and ignitible to ignite the first ignition means to thereby effect propellant ignition, said mandrel also being demolished by combustion.

3. A rocket motor comprising a substantially cylindrical motor casing having forward and rearward end members, an aperture formed in said rearward end member, an exhaust nozzle connected to said rearward end member about said aperture, a foamed rigid plastic cylindrical mandrel having a diameter greater than said aperture permanently disposed within said casing until combustion occurs, said mandrel having a plurality of omnidirectional projections extending radially and outwardly toward said casing in spaced relation thereto, each of said radial projections having a slotted portion for incorporation of igniter means therein, first igniter means carried by said mandrel adjacent the radial extremities of said projections and the aperture in the rearward end member, second igniter means positioned within the slotted portion of each of said radial projections and connected to said first igniter means for ignition thereby, and a solid propellant disposed in the cavity formed between said casing and said mandrel to form concavity-shaped, propellant burning surfaces in contacting, sealed relation to said mandrel and said rearward end member aperture; said mandrel being demolished by combustion to unseal the aperture and expose the propellant burning surfaces of said propellant upon ignition of said first and second igniter means.

4. A rocket motor comprising a substantially cylindrical motor casing having integral anterior and posterior end members, an aperture formed in said posterior end member, an exhaust nozzle connected to said posterior end member about said aperture, a foamed rigid plastic cylindrical mandrel having a diameter greater than said aperture disposed axially within said casing, said mandrel having a plurality of projections extending radially outwardly toward said casing and each further extending to a rearwardly directed end portion terminating substantially adjacent the aperture formed in the posterior end member, first igniter means positioned within each of said projections adjacent the mandrel surface, second igniter means carried by said mandrel along the length of the radial extremities of said projections and electrically connected to the first igniter means, and a solid propellant disposed in the cavity formed between said casing and said mandrel and shaped and sealed to said mandrel and said rearwardly directed end portions thereof to seal the cavity-shaped burning surfaces of said propellant formed by said mandrel from ambient conditions until after combustion occurs; said mandrel being demolished by combustion and said propellant ignited upon ignition of said igniter means.

5. A rocket motor comprising a motor casing having an opening formed therein, an exhaust nozzle connected to said casing about said opening, a combustible mandrel having a density of from about 2 to about 3 pounds per cubic foot disposed within said casing, said mandrel having a plurality of spaced projections extending radially outwardly toward said casing, each said projection incorporating a string igniter receiving slot along the length thereof, string igniter means within each said slot, an electroresponsive primer carried by said mandrel in electrical connection with said string igniter means, and a solid propellant disposed in the cavity formed between said casing and said mandrel, said solid propellant being shaped by said mandrel to form propellant burning surfaces initially sealing the spaces in the cavity formed between said mandrel and mandrel projections and said motor casing initially closing the axially centered opening and protecting the concavity-shaped burning surfaces of the propellant from exposure to ambient conditions; said mandrel being demolished by combustion to subsequently expose the propellant burning surfaces and facilitate ignition of the exposed propellant.

6. A rocket motor comprising: a motor casing, a bore formed in said casing, an exhaust nozzle connected to said casing about said bore, a rigid cellular polyurethane plastic mandrel having a diameter greater than said bore and a density of from about 2 to about 3 pounds per cubic foot disposed within said casing, said mandrel having a plurality of radial projections extending toward said casing and incorporating openings within the radial extremities of said projections, electrically responsive igniter means carried by said mandrel within the openings therein and adjacent the radial extremities of said projections, and a solid propellant disposed in the cavity formed between said casing and said mandrel in contacting and sealed relation to said mandrel to form a concavity-shaped, propellant burning surface shaped to conform with the shape of the mandrel and normally sealing the burning surface of said propellant from communication with the exhaust nozzle; said mandrel being combustible and said propellant simultaneously ignitible upon ignition of said igniter means.

7. A rocket motor comprising a substantially cylindrical motor casing, an aperture formed in one end of said casing, an exhaust nozzle connected to said one end member about said aperture, a rigid cellular mandrel having a diameter greater than said aperture and a density of from about 2 to about 3 pounds per cubic foot disposed within said casing, said mandrel having a plurality of projections extending radially and outwardly at equidistant points on said mandrel toward said casing, each said projection being provided with a bifurcation along the length thereof, a string igniter positioned within the bifurcation of each of said projections adjacent the radial extremities thereof, an ignitible seam filler disposed within each of the bifurcations in contacting relation over said string igniters and extending to the exterior surface of the mandrel, a solid propellant disposed in the cavity formed between said casing and said mandrel in sealed relation to the body and projection surfaces of said mandrel to protect the concavity-shaped propellant burning surface formed thereby from ambient conditions until combustion occurs, said propellant having a rearwardly directed portion formed in sealed relation to the after end portions of said projections to facilitate initial closing of said casing aperture prior to combustion, and an electroresponsive primer positioned within said casing adjacent said casing aperture and electrically connected with the terminal ends of said string igniters; said mandrel being combustible and said propellant simultaneously ignitible upon ignition of said string igniter by said electroresponsive primer, in turn, to initiate combustion of the mandrel and begin combustion of the propellant burning surface and subsequently open the axially centered aperture of said after end member.

8. A rocket motor comprising, in combination: a motor casing having an outlet formed therein; an expansion exhaust nozzle connected to said casing about said outlet; a combustible mandrel internally positioned in said casing to form a propellant receiving cavity therewith, said mandrel being provided with a plurality of projections extending radially outwardly toward said casing, multiple igniter means carried by said mandrel adjacent the radial extremities of said projection; a cast propellant disposed in the cavity formed between said casing and said mandrel; and means for igniting said multiple igniter means to thereby initiate combustion of said mandrel and ignition of said propellant.

9. The combination of claim 8 wherein said plurality of projections are bifurcated at the radial extremities thereof and said multiple igniter means are disposed within the bifurcated portions thereof.

References Cited

UNITED STATES PATENTS

| | | | |
|---|---|---|---|
| 2,697,325 | 12/1954 | Spaulding | 60—35.6 |
| 3,001,363 | 9/1961 | Thibodaux et al. | 102—49 |
| 2,978,377 | 4/1961 | Hall et al. | 102—98 X |
| 3,002,459 | 10/1961 | Harper | 102—98 |
| 3,009,385 | 11/1961 | Burnside | 86—1 |
| 3,010,355 | 11/1961 | Cutforth | 86—1 |
| 3,122,884 | 3/1964 | Grover et al. | 60—35.6 |
| 3,128,600 | 4/1964 | Oldham | 60—35.6 |
| 3,128,706 | 4/1964 | Rumbel | 60—35.6 |

SAMUEL FEINBERG, *Primary Examiner.*

U.S. Cl. X.R.

18—39; 60—256; 86—1; 102—99; 264—3